United States Patent
Hsu et al.

(10) Patent No.: US 7,218,927 B2
(45) Date of Patent: May 15, 2007

(54) SLEE SERVICE CONVERGENCE AND ROUTING

(75) Inventors: Willie Hsu, Fremont, CA (US); Abhay Kulkarni, Cupertino, CA (US); Ramana Devarapalli, San Jose, CA (US)

(73) Assignee: TrueTel Communications, Inc., Santa Clara, CA (US)

( * ) Notice: Subject to any disclaimer, the term of this patent is extended or adjusted under 35 U.S.C. 154(b) by 419 days.

(21) Appl. No.: 10/381,303

(22) PCT Filed: Sep. 6, 2002

(86) PCT No.: PCT/US02/28591

§ 371 (c)(1),
(2), (4) Date: Mar. 24, 2003

(87) PCT Pub. No.: WO03/024075

PCT Pub. Date: Mar. 20, 2003

(65) Prior Publication Data

US 2003/0179875 A1   Sep. 25, 2003

Related U.S. Application Data

(60) Provisional application No. 60/318,163, filed on Sep. 7, 2001.

(51) Int. Cl.
*H04Q 7/20* (2006.01)
*H04M 3/42* (2006.01)

(52) U.S. Cl. .............................. 455/422.1; 379/201.01

(58) Field of Classification Search ............ 455/422.1, 455/414.4, 416, 456.1; 379/211.01, 201.01
See application file for complete search history.

(56) References Cited

U.S. PATENT DOCUMENTS

| | | | |
|---|---|---|---|
| 5,640,319 A * | 6/1997 | Beuning et al. | 364/131 |
| 5,812,533 A * | 9/1998 | Cox et al. | 370/259 |
| 5,970,120 A | 10/1999 | Kasrai | |
| 5,995,969 A | 11/1999 | Lee et al. | |
| 6,445,782 B1 * | 9/2002 | Elfe et al. | 379/201.01 |
| 6,690,783 B2 | 2/2004 | Creamer et al. | |
| 6,731,732 B2 | 5/2004 | Creamer et al. | |
| 2002/0194396 A1 * | 12/2002 | Creamer et al. | |

OTHER PUBLICATIONS

Neil Wilkinson, "Next Generation Network Services" Chapter 12, Internet-based Services, copyright 2002, pp. 155-156.
"Objectivity/DB in Telecommunications Applications," an Objectivity, Inc. White Paper, copyright 2001, 8 pages.
Aygun, S. et al., "Conceptual Data Modeling of Multimedia Database Applications," 1998 Proceedings, Multi-Media Database Management Systems Workshop, Aug. 1998, pp. 182-189.

* cited by examiner

*Primary Examiner*—William J. Deane, Jr.
(74) *Attorney, Agent, or Firm*—Ernest J. Beffel, Jr.; Haynes Beffel & Wolfeld

(57) ABSTRACT

The present invention relates to the field of software-based services in communication networks. More particularly, it includes systems and methods for maintaining and utilizing routing data to handle event notifications generated by call handling in a service logic execution environment. Particular aspects of the present invention are described in the claims, specification and drawings.

9 Claims, 3 Drawing Sheets

```xml
<?xml version="1.0" encoding="UTF-8"?>
<xsd:schema xmlns:xsd="http://www.w3.org/2000/10/XMLSchema">
    <xsd:complexType name="SvcImplClassesType">
        <xsd:attribute name="svcEventRouting" type="xsd:string" use="optional"/>
        <xsd:attribute name="svcProvisioning" type="xsd:string" use="optional"/>
    </xsd:complexType>
    <xsd:element name="TSDL">
        <xsd:complexType>
            <xsd:sequence>
                <xsd:element name="SvcImplClasses" type="SvcImplClassesType" minOccurs="0"/>
            </xsd:sequence>
            <xsd:attribute name="iconFileName" type="xsd:string" use="optional"/>
            <xsd:attribute name="subscriberSIMode" use="default" value="manyPerSubscriber">
                <xsd:simpleType>
                    <xsd:restriction base="xsd:string">
                        <xsd:enumeration value="none"/>
                        <xsd:enumeration value="onePerSubscriber"/>
                        <xsd:enumeration value="manyPerSubscriber"/>
                        <xsd:enumeration value="onePerAddress"/>
                        <xsd:enumeration value="manyPerAddress"/>
                    </xsd:restriction>
                </xsd:simpleType>
            </xsd:attribute>
            <xsd:attribute name="globalSIMode" use="default" value="manyPerService">
                <xsd:simpleType>
                    <xsd:restriction base="xsd:string">
                        <xsd:enumeration value="none"/>
                        <xsd:enumeration value="onePerService"/>
                        <xsd:enumeration value="manyPerService"/>
                        <xsd:enumeration value="onePerAddress"/>
                        <xsd:enumeration value="manyPerAddress"/>
                    </xsd:restriction>
                </xsd:simpleType>
            </xsd:attribute>
            <xsd:attribute name="svcVersion" type="xsd:string" use="required"/>
            <xsd:attribute name="svcName" use="required">
                <xsd:simpleType>
                    <xsd:restriction base="xsd:string">
                        <xsd:maxLength value="10"/>
                    </xsd:restriction>
                </xsd:simpleType>
            </xsd:attribute>
            <xsd:attribute name="createDate" type="xsd:date"/>
            <xsd:attribute name="i18nfile" type="xsd:string"/>
        </xsd:complexType>
    </xsd:element>
</xsd:schema>
```

Figure 1

SLEE SERVICE CONVERGENCE AND ROUTING

RELATED APPLICATIONS

This application is the National Stage filing of PCT Application No. PCT/US02/28591, filed 6 Sep. 2002, entitled SLEE Service Convergence and Routing and claims the benefit of U.S. Provisional Application No. 60/318,163, filed 7 Sep. 2001, entitled SLEE Service Convergence.

This application is related to the commonly owned PCT Application No. PCT/US02/28482, filed 6 Sep. 2002, entitled Converged Service Data Automation and incorporated herein by reference, which claims the benefit of commonly owned U.S. Provisional Application No. 60/318, 123, filed 7 Sep. 2001, entitled Converged Service Data Automation and also incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of software-based services in communication networks. More particularly, it includes systems and methods for maintaining and utilizing routing data to handle event notifications generated by call handling in a service logic execution environment.

A service is a software application that is installed in a communication network to provide value added functions to subscribers. Subscribers are users of the communication network who subscribe to the services. Services control the network to perform value-added functions for subscribers based on provisioned data and network conditions. Service instance is a single run time instance of the service that provides the service functions to a subscriber. A service may include one or more service instances, which may be operating in different modes to handle different phases of providing the service. Service Logic Execution Environment (SLEE) is the run time environment in which a service executes. A SLEE is a new approach to the long-standing issue of how to supplement switches with intelligent capabilities. Sun Microsystems, Inc. has sponsored development of telecommunications computing standards, so that service logic execution environments will have open, non-proprietary architectures. The so-called JAIN SLEE standard reached the stage of public comment on 12 Aug. 2002, having gone through drafts prior to that. A SLEE is intended to support multiple services and accept software written by multiple vendors in compliance with one or more telecommunications computing standards.

Services are typically triggered by events, requests or messages (we shall use the terms event and event notification to refer to all of them) originating in the call processing system and other external systems, and some of the service execution platform provided services as well. Addresses are the identifiers that typically identify the subscribers associated with the events by points of call origination, destination or both. Addresses also may identify participants in a service other than the subscriber.

Traditionally, service execution platforms have been built to serve a single function on a proprietary platform, to deliver a single event or sequence the events from a single source to one service instance. Traditional platforms have associated a call or a sequence of events to a service instance and delivered all the events of that call or sequence to the same service instance. These special purpose platforms have worked well for stable services that support events from a single network. But special purpose platforms have proven cumbersome and expensive to modify and difficult for a support staff to integrate and maintain.

With the development and improved capabilities of wireless communications and the Internet, more and more services are being offered on multiple networks. For example, a simple voice service could serve subscribers whose calls originate from a land based telephone network, a wireless telephone network, and an the Internet connection. Similarly, a text-based chat room could serve subscribers calling in from a public telephone, using a web browser over the internet, sending/receiving Short Messages from a wireless phone, and sending/receiving email from a distribution list. Enhanced services for subscribers from multiple networks are so-called converged services.

Also, some applications require the creation of a new service instance on certain events. Others may require certain events to be handled by existing service instances, and some might require the same event to be handled by a newly created service instance or by an existing one depending on whether a service instance serving the subscriber exists.

In addition a service instance might not be associated with any subscriber or may be associated with one or multiple subscribers. For example, consider an enhanced service where the subscriber calls a global access number (like a corporate toll free number) and can access some global functions like stock price, press releases, directory and news and after authentication can access more personal services like voice mail, address book, calendar etc. or can join a group meeting or a discussion group. The service needs to handle global, subscriber specific, and subscriber shared service logic in the same service Accordingly, there is an opportunity provide software components compliant with a telecommunications computing standard for a service logic execution environment, such as the emerging JAIN SLEE standard or a subsequent standard. In this new environment designed to support multiple types of service and multiple vendors, many components need to be developed to support development and execution of new services, for instance to support converged services in a flexible manner on a generic service execution platform like a SLEE, and to associate multiple calls, event sequences, requests and activities from distinct networks with particular service instances concurrently active on the SLEE.

SUMMARY OF THE INVENTION

The present invention relates to the field of software-based services in communication networks. More particularly, it includes systems and methods for maintaining and utilizing routing data to handle event notifications generated by call handling in a service logic execution environment. Particular aspects of the present invention are described in the claims, specification and drawings.

BRIEF DESCRIPTION OF THE FIGURES

FIG. 1 is a schema that supports one embodiment of routing data.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Aspects of this invention provide methods and devices useful to a service developer to specify configuration information that allows routing logic operating on an SLEE to associate incoming events to an existing service instance or to create a new service instance, depending on the service instances that are currently active or executing on the SLEE platform. Further aspects of the invention support the service developer's specification of configuration information, including information to route incoming events to service logic having a global, subscriber or shared scope and having multiple service instances.

Figure 2:
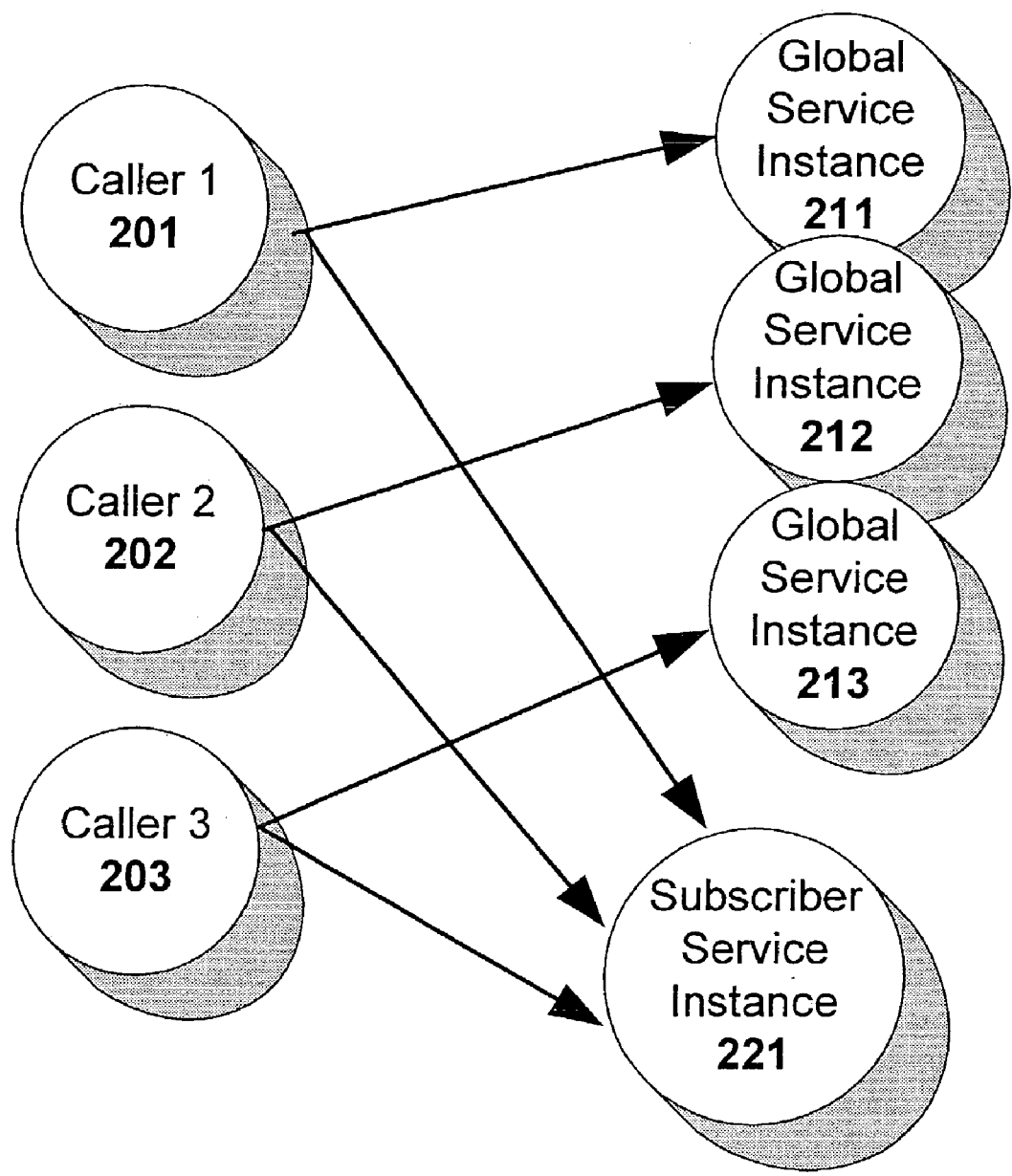
FIG. 2 is a block diagram illustrating a plurality of global service instances (GSI) handing off callers to a single subscriber service instance (SSI).

Service developers can define service configuration and service instance routing mode information in XML using a subset of the TrueConverge™ Service Description Language (TSDL). An XML schema for a subset of TSDL appears in FIG. 1. This subset includes eight service modes, divided between global service instance modes, lines 26–37, and subscriber service instance modes, lines 14–25. The GSI modes, which do not depend on identification of the subscriber, are enumerated as onePerService, manyPerService, onePerAddress and manyPerAddress. The SSI modes are enumerated as onePerSubscriber, manyPerSubscriber, onePerAddress, and manyPerAddress. A simple service may be configured to operate in just one mode. An elaborate service may be configured to operate in more than one mode, as illustrated in FIG. 2, discussed below.

GSI and SSI modes support convergence of networks. Modern telecommunications computing standards anticipate that a SLEE will have adapters that allow events and communications from a variety of networks to be processed in a common environment, on a common platform. A service may be designed using GSI and SSI modes to accept voice communications originating in a POTS network, as an SIP call across a network such as the Internet, from a wireless network or another network for which an adapter is available. Similarly, a service may be designed using GSI and SSI modes to accept text chat communications originating from a browser, a simple messaging enabled wireless phone, a wireless PDA or any other network for which an adapter is available. The developer configuring a service with GSI and SSI modes can rely on the service logic execution environment to support the adapters and to provide events at a well-defined interface.

Service developers can specify modes of operation that routing logic will apply to converging events during service execution. In one embodiment, service developers use TSDL to specify modes. A service instance may operate in a global service execution mode (gsimode). The GSI modes include onePerService, onePerAddress, manyPerAddress, or manyPerAddres. Selection of one of the GSI modes determines how events that are not associated with any subscriber should be routed to service execution instances. This controls the global scope of service logic.

Alternatively, a service instance may operate in a subscriber service execution mode (ssimode). The SSI modes include onePerSubscriber, onePerAddress, manyPerSubscriber, manyPerAddress. This determines how events that are associated with a subscriber should be routed to service execution instances. This controls the shared and subscriber scope of service logic. In this context, logic having a global scope handles events that are not associated with a particular subscriber. Subscriber scope logic is associated with an identified subscriber. Shared logic is part of the execution logic that can be used in both global and subscriber scopes.

For some services, the service developer also may configure service event routing for call backs (svcEventRouting) that the service provided code should be executed to identify an application key in cases when needed. An application key may be needed when a subscriber and address cannot be identified, e.g. for a global service scope, or to supplement subscriber and address identifiers when the selected mode requires multiple identifiers, in addition to the initial event identifier and service identifier received with an event notification. The service developer provides the class name, such as a Java or C++ programming language class, which implements the call back code.

Configuration data is used at the time of installation of the service. The SLEE or a development environment corresponding to the SLEE parses the service-provided TSDL and finds the configuration information on convergence. During service execution, when the SLEE receives an incoming event for a service, it uses this configuration information provided by the service developer and any available subscriber and address information to either create new service instances or identify an existing service instance and deliver the incoming event to the service logic.

The following table shows what the SLEE uses to identify the service instance for each of the modes. For each mode specified, in the first column an "x" indicates that for that mode the column (Service, Subscriber, Address or Application Key) is included to uniquely identify the service instance. Services that generate and use Application Keys to distinguish among instances should ensure that the Application keys are unique within the relevant scope. For instance, an application operating in a GSI-manyPerService mode should make sure that an Application Key is unique for that Service. An application operating in a SSI-manyPerAddress mode should make sure that an Application Key is unique for a combination of Service, Subscriber and Address identifiers.

| Mode | Service | Subscriber | Address | Application Key |
|---|---|---|---|---|
| GSI-onePerService | x | | | |
| GSI-onePerAddress | x | | x | |
| GSI-manyPerService | x | | | x |
| GSI-manyPerAddress | x | | x | x |
| SSI-onePerSubscriber | x | x | | |
| SSI-onePerAddress | x | x | x | |
| SSI-manyPerSubscriber | x | x | | x |
| SSI-manyPerAddress | x | x | x | x |

Figure 3:
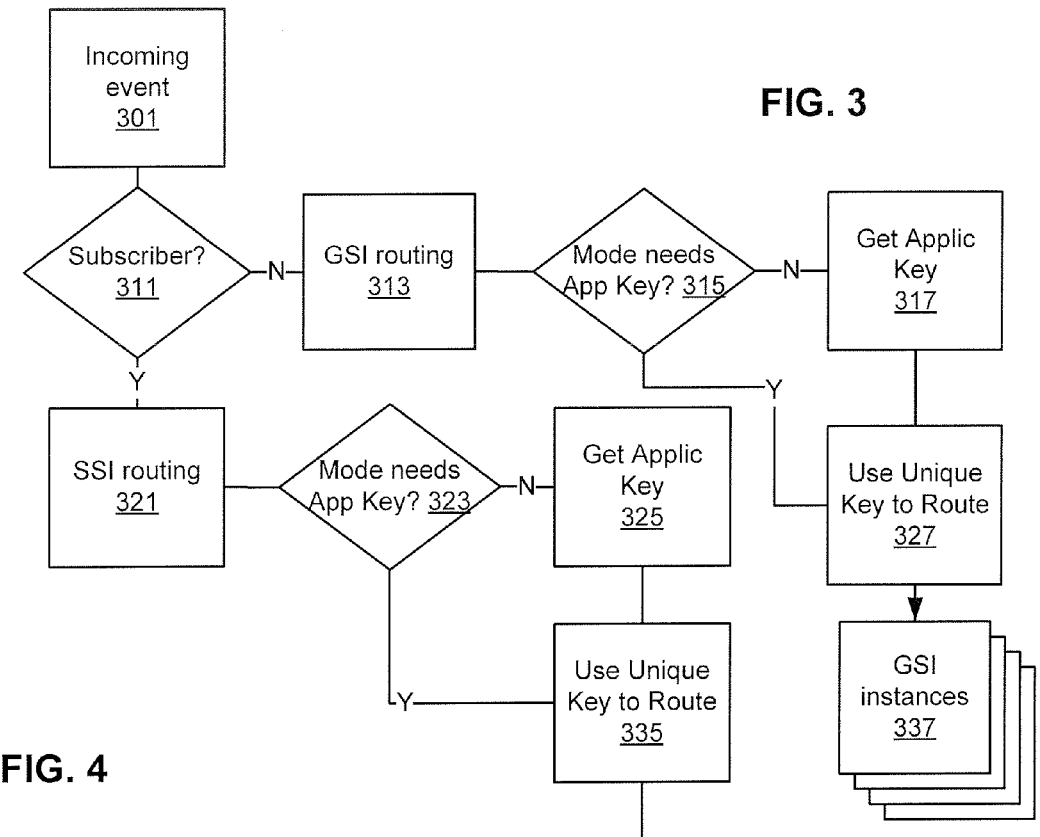
FIG. 3 is a flow chart illustrating assembly of routing information for an event and choice of a GSI or SSI instance (sometimes created in response to the event) to which the event is routed.
Figure 4:
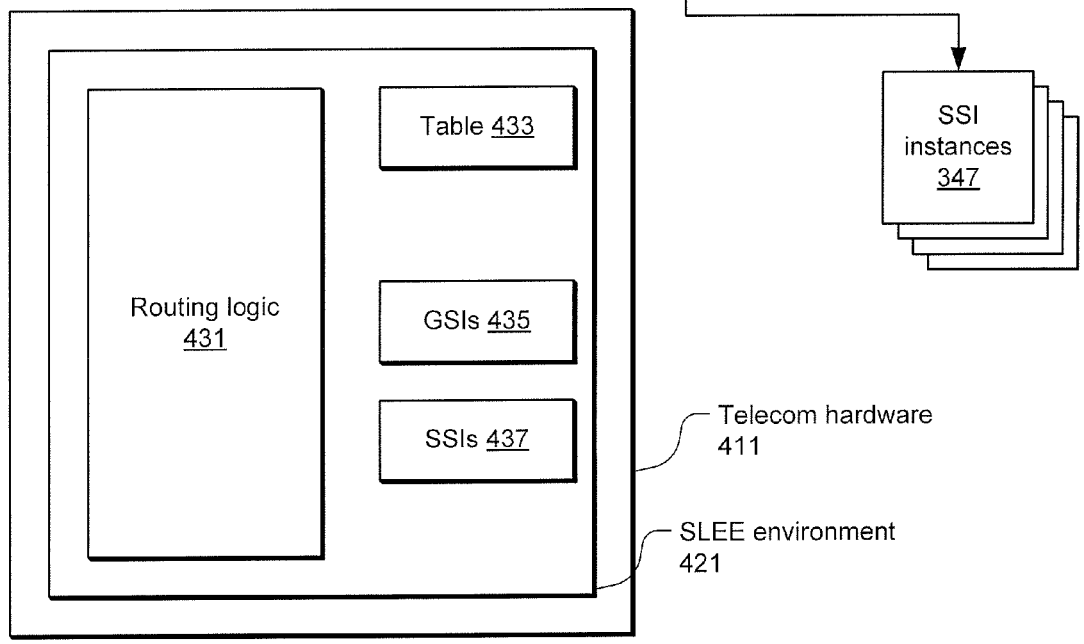
FIG. 4 is a block diagram of a system embodiment.

When the SLEE platform routing logic receives an event notification for a service, it uses data corresponding to the table above to route the event. A general description can be given of steps that should always work, even for services that operate in more than one mode. This description can be simplified and steps omitted in some cases, such as a service that only operates in a GSI mode, for which there is no subscriber, or operates in a GSI-onePerService mode, for which there is not a relevant subscriber, address or application key. Refer to FIG. 3.

1. Check 311 if there is a subscriber associated with the event 301.
2. If there is no subscriber the event notification is considered a global scope event 313. The routing logic 313, depending on the gsimode of the service 315, it looks up an address, or invokes the svcEventRouting class to get an Application Key 317, or does both, corresponding to the table above.
3. If there is a subscriber associated with an event or event notification 301, the event is considered a subscriber scope event 321. Depending on the ssimode of the service 323, the routing logic 321 looks up the address and/or makes the call on the svcEventRouting class to get the Application Key 325.
4. Using all or some of the information available—among Service, Subscriber, Address, Application Key, as needed per the gsimode and ssimode—the service instance is uniquely identified.
5. If the Application Key returned by the service is a special value (like "null"), the service handles it specially. For instance, it may generate a unique sequence number to distinguish among instances having the same value for other key fields. Or, if the special value is a sequence number, it may use the sequence number to identify an active service instance. The unique concatenated key is used 327, 335 to route the event to a GSI instance 337 or SSI instance 347.
6. If no service instance is found, a new instance is created 337, 347 and the event is delivered to it.

FIG. 2 illustrates a conference call service example. In this example, a subscriber can schedule one or more conference calls and be assigned a toll free number and conference id for the scheduled conference call. The scheduling may be done by calling an operator, using an automated phone response system, using a browser based user interface, or in some other way. When the scheduled conference time arrives, the call participants dial into the toll free number, and enter the assigned conference id to join the conference call. During the conference call, depending on authorizations, the call participants can use the conference features like calling other numbers or extending the conference. The diagram illustrates how events belonging to three callers to the conference service to the same toll free number and conference id get routed to different global scope service instances and a single subscriber scope service instance.

In one implementation, this conference call service can be implemented by service logic having two scopes. Service logic having a global scope (211, 212, 213) receives the incoming calls at the toll free number from three participants (201, 202, 203). This global service instance plays an announcement and collects conference id digits from the participants. It validates the digits. After validation, it hands off the call to a subscriber scope service instance 221. The address indicator for invoking the subscriber service instance may be the toll free number. The subscriber scope service instance 221 creates a conference or adds the user to an existing conference. The subscriber scope service instance 221 remains active during the conference all and handles in conference services. The address at this scope will be the conference id. In this example, the service description specifies gsimode as manyPerAddress, svcEventRouting class that returns a "null" application key, and ssimode as onePerSubscriberAddress.

From the preceding description, it will be apparent to those of skill in the art that a wide variety of systems and methods can be constructed from aspects and components of the present invention. One embodiment is a a method of routing an event to a particular service instance of a service, the service sharing a service logic execution environment that is compliant with a telecommunications computing standard, the service being responsive to events generated by handling calls. The routing method may include maintaining a table of active service instances. The table may include a plurality of event identifiers, service identifiers, service modes, a service instance identifier and additional identifiers including a subscriber ID, an address and an application key. The additional identifier fields that are populated may depend upon the service mode. This embodiment of the routing method further may include receiving an event corresponding to a service identifiers and requesting additional identifiers appropriate a corresponding service mode, as needed, and utilizing a combination of the service identifier and additional identifiers to associate the event with a service instance identifier. Beyond these method steps, routing logic would use the service instance identifier to route the event. Further aspects of this routing method may include invoking a new service instance when there is no active service instance corresponding to the service identifier and additional identifiers. The table above indicates the additional identifiers appropriate to various service modes. A particular service may function more than one mode, for instance using a global mode before a subscriber is identified and a subscriber mode after identification.

A further embodiment of the present invention is a telecommunications system 411 including a SLEE 421 compliant with a telecommunications computing standard. Routing logic 431 operates on the SLEE. The routing logic uses one or more routing tables 433, obtains particular additional identifiers appropriate to a service mode invoked by an event and utilizes a particular service identifier and additional identifiers to associate the event with a particular service instance 435, 437.

While the present invention is disclosed by reference to the preferred embodiment and example detailed above, it is understood that these examples are intended in an illustrative rather than in a limiting sense. Computer-assisted processing is implicated in the described embodiments. Accordingly, the present invention may be embodied in methods for computer-assisted processing, systems including logic to carry out routing according to service modes, media impressed with logic to carry out routing according to service modes, data streams impressed with logic to carry out routing according to service modes, or computer-accessible services that carry out carry out routing according to service modes. It is contemplated that modifications and combinations will readily occur to those skilled in the art, which modifications and combinations will be within the spirit of the invention and the scope of the following claims.

We claim:

1. A method of routing an event to a particular service instance of a service, the service sharing a service logic execution environment that is compliant with a telecommunications computing standard, the service being responsive to events generated by handling calls, including:

maintaining a table of active service instances, including a plurality of event identifiers and a service identifier, a service mode, a service instance identifier and additional identifiers including, a subscriber identifier, an address and an application key, as appropriate to the service mode;

receiving an event, corresponding to one or more of the service identifiers;

requesting additional identifiers appropriate to the service mode, as needed;

utilizing a combination of service identifier and additional identifiers to associate the event with a service instance identifier; and routing the event to a particular service instance identified by the service instance identifier, whereby the service instance responds to the event.

2. The method of claim 1, further including starting a new service instance when the service identifier and additional identifiers are not associated with an active service instance.

3. The method of claim 1, wherein the identifiers appropriate to the service modes are:

|  | Subscriber Identifier | Address Identifier | Application Key Identifier |
|---|---|---|---|
| Global Service Instance Modes |  |  |  |
| GSI-onePerService |  |  |  |
| GSI-onePerAddress |  | ✓ |  |
| GSI-manyPerService |  |  | ✓ |
| GSI-manyPerAddress |  | ✓ | ✓ |
| Subscriber Service Instance Modes |  |  |  |
| SSI-onePerSubscriber | ✓ |  |  |
| SSI-onePerAddress | ✓ | ✓ |  |
| SSI-manyPerSubscriber | ✓ |  | ✓ |
| SSI-manyPerAddress | ✓ | ✓ | ✓. |

4. The method of claim 1, wherein the service may, in a particular service instance, function in more than one mode, further including determining the service mode from availability of the additional identifiers.

5. The method of claim 4, further including starting a new service instance when the service identifier and additional identifiers are not associated with an active service instance.

6. A telecommunications computer program embodied in a computer readable media executable in a service logic execution environment supporting a plurality of services that is compliant with a telecommunications computing standard, the computer program including:

routing logic that is responsive to events generated by call handling, wherein the routing logic:

utilizes one or more routing tables for event identifiers that include a service identifier, a service mode, a service instance identifier and additional identifiers including a subscriber identifier, an address and an application key, as appropriate to the service mode; and obtains, upon receiving an event including a particular event identifier, a set of particular additional identifiers appropriate to one or more service modes corresponding to a particular service identifier; and utilizes a combination of the particular service identifier and additional identifiers to associate the event with a particular service instance identifier.

7. The computer program of claim 6, wherein the particular service identifier corresponds to a service that functions in more than one mode, the routing logic determines a particular service mode from availability of the additional identifiers.

8. A telecommunications system including:

a service logic execution environment that is running on a device, supporting a plurality of services and that is compliant with a telecommunications computing standard;

routing logic operating in the service logic execution environment that is responsive to events generated by call handling, wherein the routing logic:

utilizes one or more routing tables for event identifiers that include a service identifier, a service mode, a service instance identifier and additional identifiers including a subscriber id, an address and an application key, as appropriate to the service mode; and obtains, upon receiving an event including a particular event identifier, a set of particular additional identifiers appropriate to one or more service modes corresponding to a particular service identifier; and utilizes a combination of the particular service identifier and additional identifiers to associate the event with a particular service instance identifier and route the event to a particular service instance identified by the particular service instance identifier.

9. The system of claim 8, wherein the particular service identifier corresponds to a service that functions in more than one mode, the routing logic determines a particular service mode from availability of the additional identifiers.

* * * * *